United States Patent
Kashiwagi (10) Patent No.: US 8,755,111 B2
(45) Date of Patent: Jun. 17, 2014

(54) AMPLIFICATION OPTICAL FIBER, AND OPTICAL FIBER AMPLIFIER AND RESONATOR USING SAME

(71) Applicant: Fujikura Ltd., Tokyo (JP)

(72) Inventor: Masahiro Kashiwagi, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 14/037,944

(22) Filed: Sep. 26, 2013

(65) Prior Publication Data

US 2014/0029084 A1    Jan. 30, 2014

Related U.S. Application Data

(63) Continuation of application No. PCT/JP2012/054367, filed on Feb. 23, 2012.

(30) Foreign Application Priority Data

Mar. 31, 2011    (JP) .................. 2011-080036

(51) Int. Cl.
*H04B 10/17*    (2006.01)
(52) U.S. Cl.
USPC ............................. 359/341.1; 372/6; 385/123
(58) Field of Classification Search
USPC ..................... 359/341.1; 372/6; 385/123, 124
See application file for complete search history.

(56) References Cited

U.S. PATENT DOCUMENTS

| | | | |
|---|---|---|---|
| 5,121,460 A | 6/1992 | Tumminelli et al. | |
| 5,187,759 A | 2/1993 | DiGiovanni et al. | |
| 5,708,669 A * | 1/1998 | DiGiovanni et al. | ............. 372/6 |
| 2010/0103959 A1 | 4/2010 | Digiovanni et al. | |
| 2011/0149383 A1 | 6/2011 | Kashiwagi et al. | |
| 2014/0029084 A1 | 1/2014 | Kashiwagi | |

FOREIGN PATENT DOCUMENTS

| | | |
|---|---|---|
| EP | 2696451 A1 | 2/2014 |
| JP | 11-121839 A | 4/1999 |
| JP | 2003-008114 A | 1/2003 |
| JP | 2003-8114 A | 1/2003 |

(Continued)

OTHER PUBLICATIONS

R. S. Quimby et al., Yb3+ Ring Doping in High-Order-Mode Fiber for High-Power 977-nm Lasers and Amplifiers, IEEE Journal of Selected Topics in Quantum Electronics, Jan. 2009, vol. 15, No. 1, pp. 12-19; Cited in ISR.

International Search Report for PCT/JP2012/054367, Mailing Date of Mar. 19, 2012.

*Primary Examiner* — Eric Bolda (74) *Attorney, Agent, or Firm* — Westerman, Hattori, Daniels & Adrian, LLP (57) ABSTRACT

An amplification optical fiber includes a core and a clad which covers the core. The core propagates light having a predetermined wavelength in at least an LP01 mode, an LP02 mode, and LP03 mode and, in the core, when the LP01 mode, the LP02 mode, and the LP03 mode are standardized by a power, in at least a part of a region where an intensity of at least one of the LP02mode and the LP03 mode is stronger than an intensity of the LP01 mode, an active element which stimulates and emits light having a predetermined wavelength is added with a higher concentration than that in at least a part of a region where the intensity of the LP01 mode is stronger than the intensities of the LP02 mode and the LP03 mode.

16 Claims, 7 Drawing Sheets

(56) References Cited

FOREIGN PATENT DOCUMENTS

| | | | |
|---|---|---|---|
| JP | 2003-46165 | A | 2/2003 |
| JP | 2010-518633 | A | 5/2010 |
| JP | 4667535 | B1 | 4/2011 |
| JP | 5124701 | B1 | 1/2013 |
| WO | 2006/112071 | A1 | 10/2006 |
| WO | 2011/077984 | A1 | 6/2011 |

* cited by examiner

AMPLIFICATION OPTICAL FIBER, AND OPTICAL FIBER AMPLIFIER AND RESONATOR USING SAME

CROSS-REFERENCE TO RELATED APPLICATION

This application is based on and claims priority of PCT International Application No. PCT/JP2012/054367, filed on Feb. 23, 2012, the entire contents of which are incorporated herein by reference.

TECHNICAL FIELD

The present invention relates to an amplification optical fiber, and an optical fiber amplifier and a resonator using the same and particularly, to an amplification optical fiber which is capable of emitting light having a desired power, and an optical fiber amplifier and a resonator using the same.

BACKGROUND ART

As one of fiber laser devices which are used for a processing machine or medical equipment, an MO-PA (master oscillator-power amplifier) type fiber laser device in which light generated by a seed light source, such as a laser oscillator (MO: Master oscillator), is amplified by an amplifier (PA: power amplifier) to be emitted has been known. As one of amplifiers which are used as the above amplifier, an optical fiber amplifier which amplifies the light using an amplification optical fiber is known.

In such an amplification optical fiber, a double clad fiber in which an active element such as a rare-earth element is added in a core is generally used. The double clad fiber includes a double clad fiber in which the core propagates only single mode. light and a double clad fiber in which the core propagates multi-mode light. Therefore, in the double clad fiber in which the core propagates only the single mode light, a cross-sectional area of the core is small. Accordingly, in order to obtain a high power laser output, a density of light which may propagate in the core may be increased. In this case, an optical energy is transited to an undesired wavelength by a non-linear optical effect and thus an expected laser output cannot be obtained. Therefore, in accordance with demands for increasing a power of the optical fiber amplifier in recent years, an optical fiber amplifier using a double clad fiber in which a core propagates multi-mode light attracts attentions.

When the double clad fiber in which the light is propagated in a multi-mode is used as the amplification optical fiber, in the propagated light, an LP01 mode (basic mode) or a higher order mode such as an LP02 mode is pumped. Patent Document 1 discloses an amplification optical fiber in which an active element is added so as to be distributed in accordance with a higher order mode intensity profile.
[Patent Document 1] JP 2010-516633 W

SUMMARY OF THE INVENTION

Objects to be Achieved by the Invention

However, the amplification optical fiber disclosed in Patent Document 1, if the active element is simply added so as to be distributed in accordance with the higher order mode intensity profile, even the LP01 mode other than the higher order mode to be amplified is also amplified at a high amplification factor. In the LP01 mode, a location having a higher intensity is concentrated at a center of the core. Therefore, if the LP01 mode is amplified, a light density becomes too high at the center of the core so that the non-linear optical effect may easily occur, and thus expected emitting light may not be obtained. Further, in general, the amplification optical fiber is used with at least a part which is arranged to be bent. However, in the LP01 mode, in a location where the amplification optical fiber is bent, the light is distributed to an outer peripheral side of the core and a mode field is distorted so that an area is easily decreased. Accordingly, in the LP01 mode, the non-linear optical effect caused by the concentration of light may easily occur in a location where the amplification optical fiber is bent. Therefore, in order to emit high power light, there is a possibility that emitted light having a desired power may not be obtained by the non-linear optical effect.

Therefore, the present invention has been made in an effort to provide an amplification optical fiber which is capable of emitting light having a desired power, and an optical fiber amplifier and a resonator using the same.

Means for Achieving the Objects

In order to solve the above-mentioned problem, the present invention provides an amplification optical fiber including a core and a clad which covers the core. The core propagates light having a predetermined wavelength in at least an LP01 mode, an LP02 mode and an LP03 mode. In the core, when the LP01 mode, the LP02 mode and the LP03 mode are standardized by a power, in at least a part of a region where an intensity of at least one of the LP02 mode and the LP03 mode is stronger than an intensity of the LP01 mode, an active element which stimulates and emits the light having a predetermined wavelength is added with a higher concentration than that in at least a part of a region where the intensity of the LP01 mode is stronger than the intensities of the LP02 mode and the LP03 mode, and at least one of the following Formula (1) and Formula (2) is satisfied.

$$\int_0^b n(r) \times \{I_{02}(r) - I_{01}(r)\} r\,dr > 0 \quad (1)$$

$$\int_0^b n(r) \times \{I_{03}(r) - I_{01}(r)\} r\,dr > 0 \quad (2)$$

(In this case, r is a distance from the center in the radial direction of the core, $I_{01}(r)$ is an intensity of the LP01 mode in the distance r from the center in the radial direction of the core, $I_{02}(r)$ is an intensity of the LP02 mode in the distance r from the center in the radial direction of the core, and $I_{03}(r)$ is an intensity of the LP03 mode in the distance r from the center in the radial direction of the core, n(r) is a concentration of an added active element. in the distance r from the center in the radial direction of the core, and b is a radius of the core.)

In the amplification optical fiber of the present invention, in the region where at least one of the LP02 mode and the LP03 mode is stronger than the LP01 mode, the active element is added with a higher concentration than that in at least a part of a region where the intensity of the LP01 mode is stronger than at least a part of the intensities of the LP02 mode and the LP03 mode. In a region where the active element is added with a high concentration the amplification factor of the light is high so that at least one of the LP02 mode and the LP03 mode is amplified at a high amplification factor. In the meantime, at least a part of the region where the intensity of the LP01 mode is higher than the intensities of the LP02 mode and the LP03 mode, the amplification factor of the light is not high so that the amplification of the LP01 mode is suppressed. As described above, in the amplification optical fiber of the present invention, the amplification of the LP01 mode is suppressed, so that at least one of the LP02 mode and the LP03 mode is actively amplified so as to satisfy at least one of the above Formula (1) and Formula (2) in the entire fiber.

However, a high order mode such as the LP02 mode or the LP03 mode, a location having a high intensity is distributed in the radial direction of the core. Accordingly, even when the high order mode is amplified, the non-linear optical effect is hard to occur as compared with the case when the LP01 mode is amplified. Therefore, even when the high power light is emitted, optical energy is suppressed to be transited to a different wavelength by the non-linear optical effect and desired power light may be emitted.

According to the knowledge of the inventor, even when the amplification optical fiber is used while being bent in the high order mode, center of light is hard to be deviated to the outer peripheral side of the core, and the area of the mode field is also hard to be small. Therefore, in the amplification optical fiber of the invention, even when the amplification optical fiber is used while being bent, the occurrence of the non-linear optical effect due to the concentration of the light is suppressed and the power of the light may be suppressed to be decreased as compared with the power of the light which is emitted while being used in a linear status.

Further, in the core, when the LP01 mode, the LP02 mode and the LP03 mode are standardized by a power, in at least a part of a region where the intensity of the LP02 mode is stronger than the intensity of the LP01 mode and at least a part of a region where the intensity of the LP03 mode is stronger than the intensity of the LP01 mode, the active element may be added with a higher concentration than that in at least a part of a region where the intensity of the LP01 mode is stronger than the intensities of the LP02 mode and the LP03 mode, and both Formula (1) and Formula (2) may be satisfied.

In such an amplification optical fiber, in the entire fiber, the LP02 mode and the LP03 mode are amplified at a higher amplification factor than that of the LP01 mode so as to satisfy the above Formula (1) and Formula (2). Accordingly, higher power light may be emitted.

Further, in the core, when the LP01 mode, the LP02 mode and the LP03 mode are standardized by a power, in at least a part of a region where both the intensity of the LP02 mode and the intensity of the LP03 mode are stronger than the intensity of the LP01 mode, the active element may be added with a higher concentration than that in at least a part of a region where the intensity of the LP01 mode is stronger than the intensities of the LP02 mode and the LP03 mode.

According to such an amplification optical fiber, in the entire fiber, the active element may be added in at least a part of the region where both the intensities of the LP02 mode and the LP03 mode are stronger than the intensity of the LP01 mode so as to satisfy the above Formula (1) and Formula (2). Therefore, the active element may be efficiently added so as to amplify the LP02 mode and the LP03 mode at a higher amplification factor than that of the LP01 mode.

Further, in the core, when the LP01 mode, the LP02 mode and the LP03 mode are standardized by a power, in the entire region where both the intensity of the LP02 mode and the intensity of the LP03 mode are stronger than the intensity of the LP01 mode, the active element may be added with a higher concentration than that in at least a part of a region where the intensity of the LP01 mode is stronger than the intensities of the LP02 mode and the LP03 mode.

According to the amplification optical fiber, higher power light may be emitted.

Further, in the core, when the LP01 mode, the LP02 mode and the LP03 mode are standardized by a power, in an entire region where the intensity of at least one of the LP02 mode and the LP03 mode is stronger than the intensity of the LP01 mode, the active element may be added with a higher concentration than that in at least a part of a region where the intensity of the LP01 mode is stronger than the intensities of the LP02 mode and the LP03 mode, and both Formula (1) and Formula (2) may be satisfied.

According to such an amplification optical fiber, in a region other than the region where the intensity of at least one of the LP02 mode and the LP03 mode is higher than the intensity of the LP01 mode, the light is amplified at a high amplification factor and the LP02 mode and the LP03 mode are amplified at a higher amplification factor than the LP01 mode in the entire fiber. Accordingly, the non-linear optical effect may be suppressed so that higher power light may be emitted.

Further, no active element may be added in at least a part of the region where the intensity of the LP01 mode is stronger than the intensities of the LP02 mode and the LP03 mode.

With this configuration, in at least a part of the region where the intensity of the LP01 mode is strong, the light is not amplified and the amplification of the LP01 mode is suppressed in the entire fiber. Accordingly, the non-linear optical effect may be suppressed.

In the core, when the LP01 mode, the LP02 mode and the LP03 mode are standardized by a power, in at least a part of a region where the intensity of at least one of the LP02 mode and the LP03 mode is stronger than the intensity of the LP01 mode and the active element which stimulates and emits the light having the predetermined wavelength is added with a higher concentration than that in an entire region where the intensity of the LP01 mode is stronger than the intensities of the LP02 mode and the LP03 mode.

According to such an amplification optical fiber, in a region where the active element is added with a high concentration, even in a region where the intensity of the LP01 mode is higher than the intensities of the LP02 mode and the LP03 mode, the light is amplified at a high amplification factor. By doing this, in a location where the light is amplified at a high amplification factor, at least one of the LP02 mode and the LP03 mode is amplified at a high amplification factor. Further, in the entire fiber, at least one of the LP02 mode and the LP03 mode is amplified at a higher amplification factor than that of the LP01 mode and higher power light may be emitted.

Further, in the core, when the LP01 mode, the LP02 mode and the LP03 mode are standardized by a power, in at least a part of a region where the intensity of the LP02 mode is stronger than the intensity of the LP01 mode and at least a part of a region where the intensity of the LP03 mode is stronger than the intensity of the LP01 mode, the active element may be added with a higher concentration than that in an entire region where the intensity of the LP01 mode is stronger than the intensities of the LP02 mode and the LP03 mode, and both Formula (1) and Formula (2) may be satisfied.

In such an amplification optical fiber, in the entire fiber, the LP02 mode and the LP03 mode are amplified at a higher amplification factor than that of the LP01 mode so that higher power light may be emitted.

Further, in the core, when the LP01 mode, the LP02 mode and the LP03 mode are standardized by a power, in at least a part of a region where both the intensity of the LP02 mode and the intensity of the LP03 mode are stronger than the intensity of the LP01 mode, the active element may be added with a higher concentration than that in an entire region where the intensity of the LP01 mode is stronger than the intensities of the LP02 mode and the LP03 mode.

According to such an amplification optical fiber, the active element may be added in at least a part of the region where the intensities of both the LP02 mode and the LP03 mode is higher than the intensity of the LP01 mode. Therefore, in the entire fiber, the active element may be efficiently added so as to amplify the LP02 mode and the LP03 mode at a higher amplification factor than that of the LP01 mode.

In the core, when the LP01 mode, the LP02 mode and the LP03 mode are standardized by a power, in the entire region where both the intensity of the LP02 mode and the intensity of the LP03 mode are stronger than the intensity of the LP01 mode, the active element may be added with a higher concentration than that in the entire region where the intensity of the LP01 mode is stronger than the intensities of the LP02 mode and the LP03 mode.

According to such an amplification optical fiber, in the entire region where the intensities of the LP02 mode and the LP03 mode are stronger than the intensity of the LP01 mode, the light is amplified at a higher amplification than that in the entire region where the intensity of the LP01 mode is higher than the intensities of the LP02 mode and the LP03 mode. Accordingly, the LP02 mode and the LP03 mode are amplified at a higher amplification factor than that of the LP01 mode and higher power light may be emitted.

In the core, when the LP01 mode, the LP02 mode and the LP03 mode are standardized by a power, in the entire region where the intensity of at least one of the LP02 mode and the LP03 mode is stronger than the intensity of the LP01 mode, the active element may be added with a higher concentration than that in the entire region where the intensity of the LP01 mode is stronger than the intensities of the LP02 mode and the LP03 mode, and both Formula (1) and Formula (2) are satisfied.

According to such an amplification optical fiber, in a region other than the region where the intensity of the LP01 mode is higher than that of at least one of the LP02 mode and the LP03 mode, the light is amplified at a high amplification factor. Accordingly, in the entire fiber, the LP02 mode and the LP03 mode may be amplified at a high amplification factor and higher power light may be emitted.

No active element may be added in the region where the intensity of the LP01 mode is stronger than the intensities of the LP02 mode and the LP03 mode.

According to the amplification optical fiber, the light is not amplified in the region where the intensity of the LP01 mode is stronger than the intensities of the LP02 mode and the LP03 mode, and the amplification of the LP01 mode may be suppressed in the entire fiber and the occurrence of the non-linear optical effect may be further suppressed.

The amplification optical fiber may further include a pair of stress applying units which pinches the core in the clad. By providing the stress applying units, single polarized light may be propagated.

An optical fiber amplifier of the present invention includes the amplification optical fiber, a seed light source which allows seed light including an LP02 mode and an LP03 mode to enter the amplification optical fiber; and a pumping light source which emits pumping light which pumps the active element of the amplification optical fiber.

According to the optical fiber amplifier, even when the LP01 mode is pumped, the LP02 mode or the LP03 mode are amplified at a higher amplification factor than that of the LP01 mode so that even when the high power light is emitted, desired power light may be emitted.

Further, in the optical fiber amplifier, the seed light which enters the amplification optical fiber may pumps only an axial symmetrical mode of the amplification optical fiber.

According to the optical fiber amplifier, the asymmetrical high order mode does not propagate in the amplification optical fiber, so that the asymmetrical high order mode is not amplified and emitted, which may allow light to be emitted with a good beam quality.

A resonator according to the present invention includes the amplification optical fiber, a pumping light source which emits pumping light which pumps the active element of the amplification optical fiber; a first FBG (Fiber Bragg Grating) which is provided at one side of the amplification optical fiber to reflect at least part of light having a wavelength of light which is emitted by the active element which is pumped by the pumping light; and a second FBG which is provided at the other side of the amplification optical fiber to reflect light having the same wavelength as the light reflected by the first FBG at a reflectance which is lower than that of the first FBG.

According to the resonator, during the resonance of the light, when the light propagates in the core of the amplification optical fiber, the LP02 mode or the LP03 mode is amplified to be stronger than the LP01 mode. Therefore, the non-linear optical effect is suppressed so that even when the high power light is emitted, desired power light may be emitted.

Effect of the Invention

As described above, the present invention provides an amplification optical fiber which is capable of emitting light having a predetermined power, and an optical fiber amplifier and a resonator using the same.

DESCRIPTION OF THE EMBODIMENTS

Hereinafter, preferred embodiments of an amplification optical fiber, an optical fiber amplifier, and a resonator according to the present invention will be described in detail below by referring to the drawings.

(First Embodiment)

Figure 1:
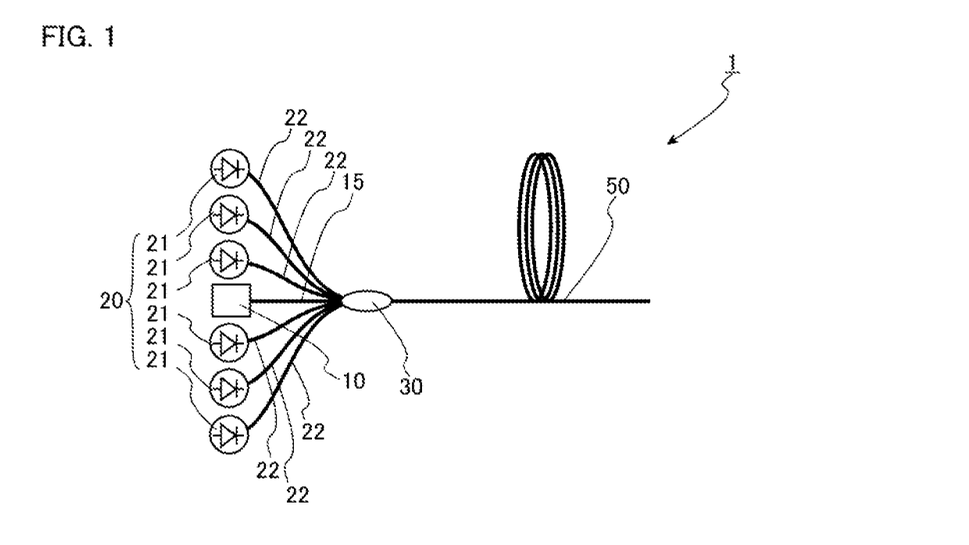
FIG. 1 is a diagram illustrating an optical fiber amplifier according to a first embodiment of the present invention.

FIG. 1 is a diagram illustrating an optical fiber amplifier according to a first embodiment of the present invention.

As illustrated in FIG. 1, an optical fiber amplifier 1 according to the first embodiment includes a seed light source 10 which emits light serving as seed light, a pumping light source 20 which emits pumping light, an optical combiner 30 which seed light and pumping light enter, and an amplification optical fiber 50 which the seed light and the pumping light emitted from the optical combiner 30 enter and an active element pumped by the pumping light is added to, as main components.

The seed light source 10, for example, is configured by a semiconductor laser device or a Fabry-Perot type or a fiber ring type laser device. The seed light source 10 is configured to emit light including an LP02 mode and an LP03 mode from the optical fiber. Further, if the seed light is light having the LP02 mode and the LP03 mode, the seed light which is emitted from the seed light source 10 is not specifically limited. A wavelength is a wavelength at which the active element which is added to the amplification optical fiber 50 is stimulated and emitted. For example, if the active element is ytterbium (Yb), laser light having a wavelength of 1070 nm is used.

Further, emitted light of the seed light source 10 is emitted from a single mode fiber 15 including a core and a clad which covers the core. The single mode fiber 15 propagates the light emitted from the seed light source 10, as a single mode light of the LP01 mode. A configuration of the single mode fiber 15 is not specifically limited. However, if the wavelength of the seed light is 1070 nm as described above, a diameter of the core is 10 μand a relative refractive index difference between the core and the clad is 0.13%.

The pumping light source 20 includes a plurality of laser diodes 21. In the first embodiment, the laser diode 21 is a Fabry-Perot semiconductor laser having a GaAs based semiconductor as a material and emits light having a center wavelength of 915 nm. Further, the respective laser diodes 21 of the pumping light source 20 are connected to a multi-mode fiber 22 and the pumping light emitted from the laser diode 21 propagates in the multi-mode fiber 22 as multi-mode light.

The optical combiner 30 to which the multi-mode fiber 22 and the single mode fiber 15 are connected is configured such that the single mode fiber 15 is disposed at the center and a portion where the multi-mode fibers are disposed is fused and stretched around the single mode fiber to be integrated with each other. The optical combiner 30 is optically connected to the amplification optical fiber 50.

Figure 2:
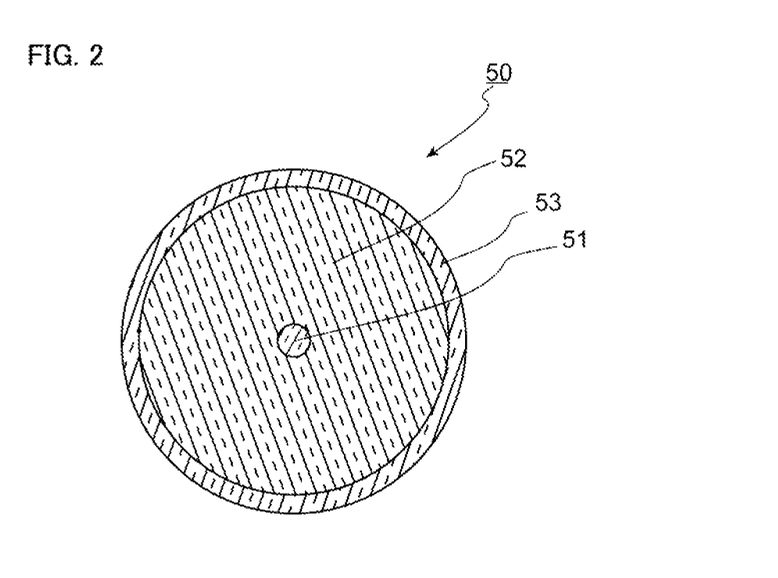
FIG. 2 is a diagram illustrating a structure in a cross-section which is perpendicular to a length direction of the amplification optical fiber of FIG. 1.

FIG. 2 is a diagram illustrating a structure in a cross-section which is perpendicular to a length direction of the amplification optical fiber 50. As illustrated in FIG. 2, the amplification optical fiber 50 includes a core 51, a clad 52 which covers the core 51, and an outer clad 53 which covers the clad 52. A refractive index of the clad 52 is lower than a refractive index of the core 51 and a refractive index of the outer clad 53 is lower than the refractive index of the clad 52. For example, in the first embodiment, the relative refractive index difference between the core 51 and the clad 52 is 0.32%. Further, for example, a diameter of the core 51 is 30 μm, an outer diameter of the clad 52 is 420 μm, and an outer diameter of the outer clad 53 is 440 μm. Further, an example of a material which configures the core 51 may include quartz to which an element such as aluminum which increases a refractive index of the quartz is added. Ytterbium (Yb) which is an active element which becomes a pumped state by the pumping light emitted from the pumping light source 20 is added in a region of at least a part of the core 51. Further, as such an active, element, rare earth elements such as neodymium (Nd) or erbium (Er) may be included in addition to ytterbium (Yb). Furthermore, as an active element, in addition to the rare earth element, bismuth (Si) or Chrome (Cr) may be included. An example of a material which configures the clad 52 includes quartz to which no dopant is added and an example of a material which configures the outer clad 53 includes ultraviolet curable resin.

Light having a predetermined wavelength from the seed light source is trapped and propagated in the core 51 by the refractive index difference between the core 51 and the clad 57. A mode of the light which propagates in the core 51 includes an LP02 mode or an LP03 mode as a higher order mode, in addition to the LP01 mode which is a base mode. In the amplification optical fiber 50 according to the first embodiment, LP04 or higher order mode may be presented but in the first embodiment, amplification to the LP04 or higher order mode is not considered. Alternatively, a wavelength of the light of the seed light source, sizes of the core 51 and the clad 52, and the relative refractive index difference between the core 51 and the clad 52 may be set so as not to propagate the LP04 or higher order mode. As described above, in order to set the wavelength, the sizes, and the relative refractive index difference so as not to propagate the LP04 or higher order mode, for example, a wavelength of the seed light may be 1070 nm, a diameter of the core 51 may be 30 μm, and the relative refractive index difference between the core 51 and the clad 52 may be 0.32%.

Figure 3A:
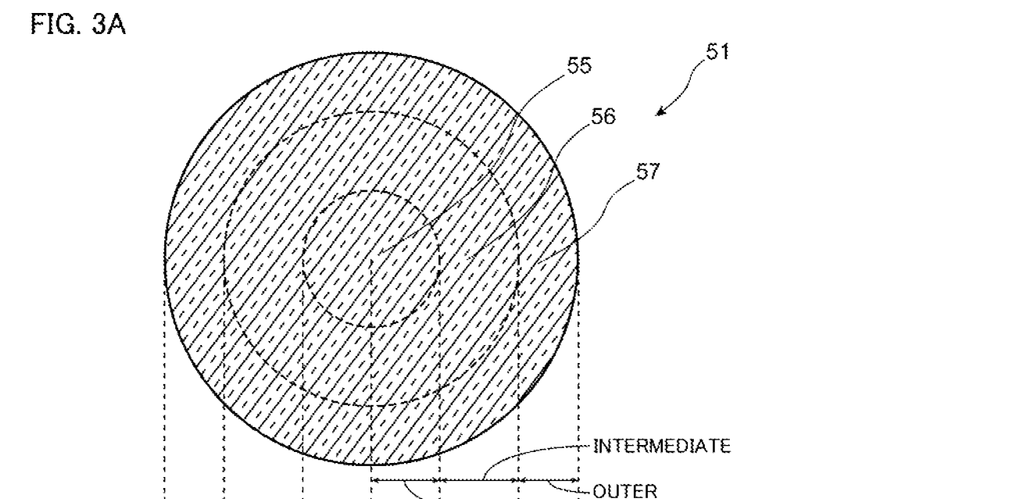
FIGS. 3A to 3D are diagrams illustrating a state of a core of the amplification optical fiber of FIG. 2.
Figure 3B:
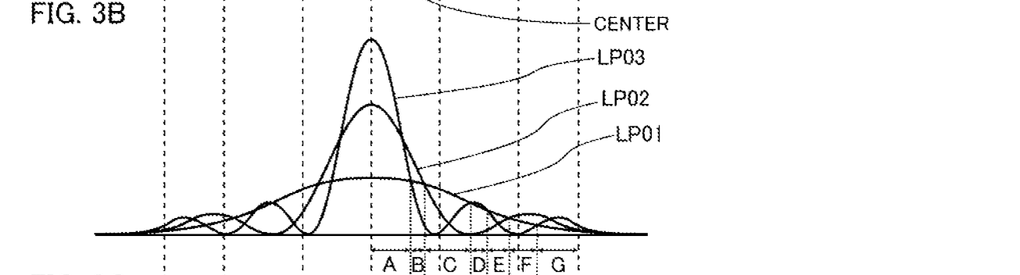
Figure 3C:
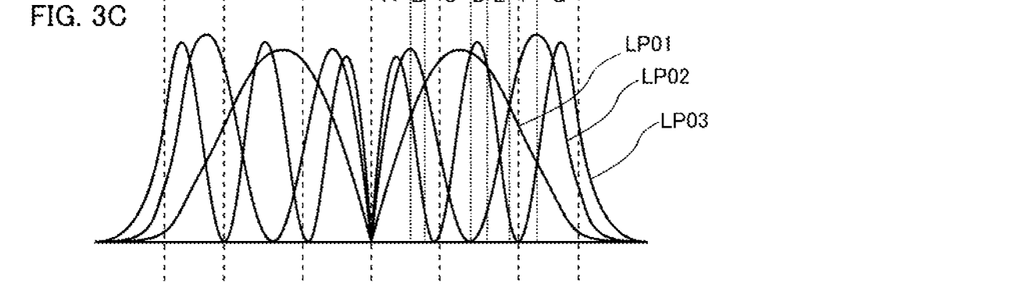
Figure 3D:
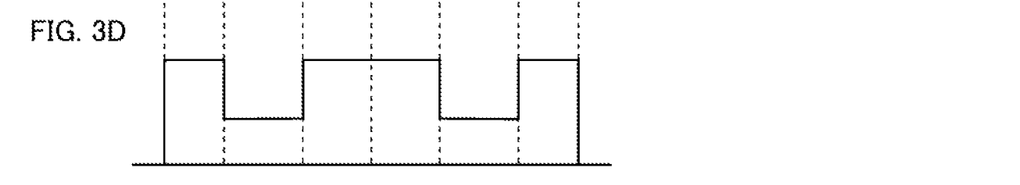

Next, the core 51 of the amplification optical fiber 50 will be described in detail. FIGS. 3A to 3D is a diagram illustrating a state of the core 51 of the amplification optical fiber 50 illustrated in FIG. 2. Specifically, FIG. 3A is a diagram illustrating a structure of the core 51 in a cross-section which is perpendicular to a length direction of the amplification optical fiber 50. Further, FIG. 3B is a diagram illustrating a distribution of an intensity per standardized unit area in the LP01 mode, the LP02 mode and the LP03 mode which are propagated in the core 51. FIG. 3C is a diagram illustrating a distribution of a standardized power obtained by integrating the intensity of the LP01 mode and the LP02 mode and the LP03 mode, which are propagated in the core 51, with an area. Further, FIG. 3D is a diagram illustrating a state of a distribution of a concentration of the active element which is added to the core 51.

As illustrated in FIG. 3B, each mode has an intensity distribution in which the intensity is strongest at a center of the core 51. The LP03 mode has the strongest intensity at the center, the LP02 mode has the second stronger intensity, and the LP01 mode has the least strong intensity. When it is spaced apart from the center of the core 51 in a radial direction, the intensity of the LP01 mode is stronger than the intensity of the LP03 mode. Here, as illustrated in FIGS. 3A to 3D, a region from the center of the core 51 in the radial direction to a point where the intensity of the LP01 mode becomes stronger than the intensity of the LP03 mode is referred. to as a region A. Further, when it is spaced apart from the center of the core 51 in the radial direction, the intensity of the LP01 mode becomes stronger than the intensities of the LP02 mode and the LP03 mode. Here, a region from an outer peripheral side of the region A to a point where the intensity of the LP01 mode becomes stronger than the intensities of the LP02 mode and the LP03 mode is referred to as a region B. Further, when it is spaced apart from the center of the core 51 in the radial direction, the intensity of the LP03 mode is temporarily stronger than the intensity of the LP01 mode. Here, at an outer peripheral side of the region B, a region where the intensity of the LP03 mode temporarily becomes stronger than the intensity of the LP01 mode is referred to as a region C and a region where the intensity of the LP03 mode is temporarily stronger than the intensity of the LP01 mode is referred to as a region D. When it is spaced apart from the center of the core 51 in the radial direction, the intensity of the LP01 mode is stronger than the intensities of the LP02 mode and the LP03 mode at an outer peripheral side of the region D. At the outer peripheral side of the region 5, a region where the intensity of the LP01 mode is stronger than the intensities of the LP02 mode and the LP03 mode is referred to as a region E. Further, at an outer peripheral side of the region E, the intensity of the LP02 mode is stronger than the intensity of the LP01 mode and at the outer peripheral side the intensity of the LP01 mode is weaker than the intensities of the LP02 mode and the LP03 mode. At an outer peripheral side of the region E, a region where the intensity of the LP01 mode becomes weaker than the intensities of the LP02 mode and the LP03 mode is referred to as a region F and a region at an outer peripheral side of the region F is referred to as a region G.

As described above, when the regions are defined, a cross-section of the region A which is perpendicular to the length direction of the core 51 has a circular shape and other regions B to G are distributed in a ring shape. When the diameter of the core 51 is 30 μm as described above, a distance between the center and a border of the region A and the region B is approximately 3 μm, a distance between the center and a border of the region B and the region C is approximately 4 μm, a distance between the center and a border of the region C and the region D is approximately 7 μm, a distance between the center and a border of the region S and the region E is approximately 8.5 μm, a distance between the center and a border of the region E and the region F is approximately 10 μm, and a distance between the center and a border of the region F and the region G is approximately 12 μm.

When the regions which are divided as described above are classified by the intensities of the modes, in the region A and the region G, the intensities of the LP02 mode and the LP03 mode are stronger than the intensity of the LP01 mode. Further, in the region B and the region F, the intensity of the LP02 mode is stronger than the intensity of the LP01 mode, in the region D, the intensity of the LP03 mode is stronger than the intensity of the LP01 mode, and in the region C and the region E, the intensity of the LP01 mode is stronger than the intensities of the LP02 mode and LP03 mode.

The relation of the intensities of the LP01 mode, the LP02 mode, and the LP03 mode is similar in the distribution illustrated in FIG. 3C.

In the core 51, when the LP01 mode, the LP02 mode and the LP03 mode are standardized by a power, in at least a part of a region where the intensity of at least one of the LP02 mode and the LP03 mode is stronger than the intensity of the LP01 mode, the active element is added with a higher concentration than that in at least a part of a region where the intensity of the LP01 mode is stronger than the intensities of the LP02 mode and the LP03 mode. In the first embodiment, as illustrated in FIG. 3D, in a center region 55 and an outer peripheral region 57 including the region A and the region G where the intensities of the LP02 mode and the LP03 mode are stronger than the intensity of the LP01 mode, and the region B and the region G which is close to the region F where the intensity of the LP02 mode is stronger than the intensity of the LP01 mode, Yb which is one of the active elements is added with a higher concentration than that in an intermediate region 56 including the region C which is close to the region D and the region E where the intensity of the LP01 mode is stronger than the intensity of the LP02 mode and the LP03 mode. Further, the active element is added in a circumferential direction of the core 51 with the same concentration.

The concentration of the active element Yb to be added in the first embodiment is $16 \times 10^{25}$ particles/m$^3$ in the center region 55 and the outer peripheral region 57 and $8 \times 10^{25}$ particles/m$^3$ in the intermediate region 56.

By adding the active element, the amplification optical fiber 50 satisfies the following Formulae (1) and (2).

$$\int_0^b n(r) \times \{I_{02}(r) - I_{01}(r)\} r dr \times O \quad (1)$$

$$\int_0^b n(r) \times \{I_{03}(r) - I_{01}(r)\} r dr > O \quad (2)$$

In this case, r is a distance from the center in the radial direction of the core 51, $I_{01}(r)$ is an intensity of the LP01 mode in a distance r from the center in the radial direction of the core 51 illustrated in FIG. 3B, $I_{02}(r)$ is an intensity of the LP02 mode in the distance r from the center in the radial direction of the core 51 illustrated in FIG. 3B, and $I_{03}(r)$ is an intensity of the LP03 mode in the distance r from the center in the radial direction of the core 51 illustrated in FIG. 3B, n(r) is a concentration of an added active element in the distance r from the center in the radial direction of the core 51 illustrated in FIG. 3B, and b is a radius of the core 51. Further, the unit of r is m and the units of $I_{01}(r)$, $I_{02}(r)$, $I_{03}(r)$ are W/m$^2$, the unit of n(r) is particles/m$^3$, and the unit of b is m.

If the concentration of the added active element Yb in the center region 55, the intermediate region 55, and the outer peripheral region 57 satisfies. the relation of Formula (1) and Formula (2), the concentration may be appropriately changed. That is, if the distribution of the concentration of the added active element in the core 51 satisfies the relation of Formula (1) and Formula (2), the LP02 mode and the LP03 mode may be amplified at a higher amplification factor than that of the LP01 mode in the entire fiber. Therefore, it is possible to prevent the non-linear optical effect from occurring and amplify the light at a desired amplification factor.

As described above, a characterized point of the present invention is as follows: when the LP01 mode, the LP02 mode and the LP03 mode are standardized by a power in order to satisfy the relation of Formula (1) and Formula (2), in at least a part of a region where an intensity of at least one of the LP02 mode and the LP03 mode is stronger than the intensity of LP01 mode, the active element is added with a higher concentration than that in at least a part where the intensity of the LP01 mode is stronger than the intensities of the LP02 mode and the LP03 mode.

Next, an operation of the optical fiber amplifier 1 will be described.

First, the seed light from the seed light source 10 is emitted from the single mode fiber 15. A wavelength of the seed light is, for example, 1070 μm as described above. In this case, the seed light having the LP01 mode is propagated by the above-described configuration of the single mode fiber 15. The seed light which propagates in the single mode fiber 15 enters the optical combiner 30.

Further, the pumping light which pumps the active element Yb which is added in the core 51 of the amplification optical fiber 50 is emitted from the pumping light source 20. In this case, the wavelength is 915 μm as described above. The pumping light emitted from the pumping light source 20 propagates in the multi-mode fiber 22 and enters the optical combiner 30.

The seed light and the pumping light which enter the optical combiner 30 enters the amplification optical fiber 50, the seed light propagates in the core 51 of the amplification optical fiber 50 and the pumping light mainly propagates in the clad 52 of the amplification optical fiber 50. The seed light enters mainly as an LP01 mode but the core 51 of the amplification optical fiber 50 may propagate the light having a wavelength of the seed light as the LP01 mode and the LP02 mode and the LP03 mode. Therefore, when the LP01 mode enters, the LP02 mode and the LP03 mode excite and the light propagates as the LP01 mode and the LP02 mode and the LP03 mode. When the pumping light passes through the core 51, the active element Yb which is added in the core 51 is pumped. The pumped active element Yb causes stimulated emission by the seed light and the seed light of the LP01 mode, the LP02 mode and the LP03 mode are amplified by the stimulated emission.

In this case, the concentration of the active element Yb in the center region 55 and the outer peripheral region 57 of the core 51 is higher than the concentration of the active element Yb in the intermediate region 56 of the core 51 and satisfies the above Formula (1) and Formula (2). Therefore, in the entire core 51, the LP02 mode and the LP03 mode may be amplified at a higher amplification factor than that of the LP01 mode. Specifically, in the region C which is close to the region D and the region E where the intensity of the LP01 mode is stronger than the intensities of the LP02 mode and the LP03 mode, the active element Yb is added with a lower concentration so that the amplification of the LP01 mode light is suppressed.

As described above, the active element is added so as to satisfy the above Formula (1) and Formula (2), so that the seed light in which in the entire core 51, the LP02 mode and the LP03 mode may be amplified at a higher amplification factor than that of the LP01 mode is emitted from the amplification optical fiber 50 as emitted light. Accordingly, in the emitted light, the LP01 mode power is suppressed to be low.

As described above, in the amplification optical fiber 50 of the first embodiment, in the region A and the region B, a part of the region F, and the region G where at least one of the LP02 mode and the LP03 mode is stronger than the LP01 mode, the active element is added to have a higher concentration than that of a part of the region C and the region E where the intensity of the LP01 mode is stronger than at least a part of the intensities of the LP02 mode and the LP03 mode. In a region where the active element is added with a high concentration, the amplification factor of the light is high so that at least one of the LP02 mode and the LP03 mode is amplified at a high amplification factor. Specifically, in the region A and the region C, the light is amplified at a high amplification factor so that both the LP02 mode and the LP03 mode are amplified at a high amplification factor. In the meantime, in the part of the region C and the region E where the intensity of the LP01 mode is stronger than the intensities of the LP02 mode and the LP03 mode, the amplification factor of the light is high. Therefore, the amplification of the LP01 mode is suppressed. As described above, in the amplification optical fiber according to the first embodiment, the amplification of the LP01 mode is suppressed and in the entire amplification optical fiber 50, the LP02 mode and the LP03 mode are actively amplified so as to satisfy the above Formula (1) and Formula (2). As described above, in the higher order mode which are the LP02 mode or the LP03 mode which are actively amplified in the amplification optical fiber 50, a location where the intensity is strong is distributed in the radial direction of the core 51. Accordingly, even when the high order mode is amplified, the non-linear optical effect is hard to occur as compared with the case when the LP01 mode is amplified. Accordingly, in the amplification optical fiber 50, the light may be amplified at a higher amplification factor while suppressing the hindrance of the non-linear optical effect and high power light may be emitted in the entire amplification optical fiber 50.

Further, even when the amplification optical fiber 50 is used while being bent, in the higher order mode, the center of light is hard to be deviated to the outer peripheral side of the core 51, and the area of the mode field is also hard to be reduced. Therefore, in the amplification optical fiber 50 of the present embodiment, even when the amplification optical fiber is used while being bent, the occurrence of the non-linear optical effect due to the concentration of the output light is suppressed and the power of the light may be suppressed to be decreased as compared with the power of the light which is output while being used in a linear status.

(Second Embodiment)

Next, a second embodiment of the present invention will be described in detail with reference to FIGS. 4A to 4D. Same or similar components as the first embodiment are denoted by the same reference numerals and a repeated description will not be provided if not specifically described. FIGS. 4A to 4D are diagrams illustrating a state of a core of an amplification optical fiber according to a second embodiment of the present invention and corresponds to FIGS. 3A to 3D of the first embodiment.

Figure 4A:
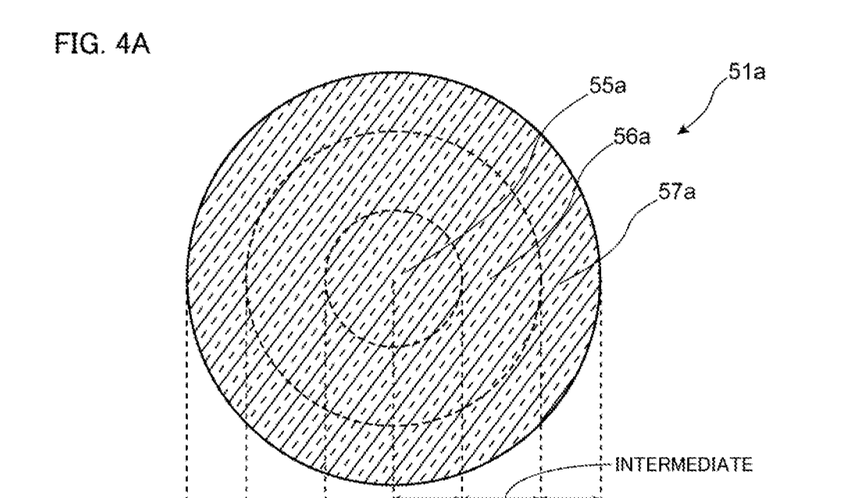
FIGS. 4A to 4D are diagrams illustrating a state of a core of an amplification optical fiber according to a second embodiment of the present invention.
Figure 4B:
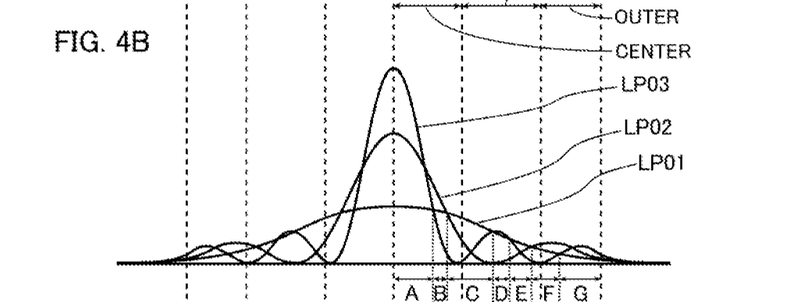
Figure 4C:
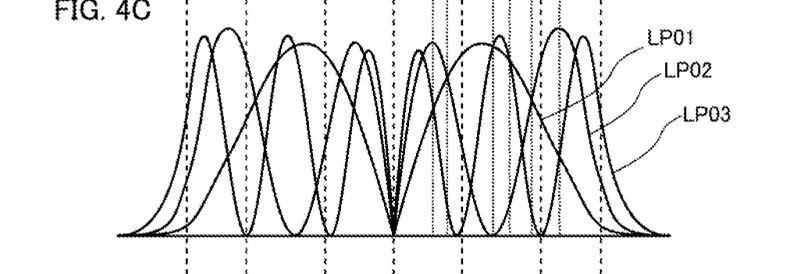
Figure 4D:
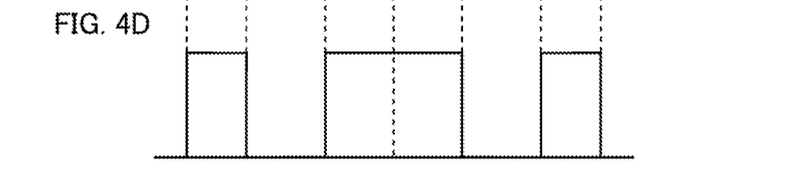

As illustrated in FIG. 4A, the amplification optical fiber in the present embodiment uses a core 51a, instead of the core 51 of the amplification optical fiber 50 in the first embodiment. Similarly to the core 51 of the first embodiment which is divided into the center region 55, the intermediate region 56, and the outer peripheral region 57, the core 51a is divided into a center region 55a, an intermediate region 55a, and an outer peripheral region 57a. In the center region 55a and the outer peripheral region 57a, as illustrated in FIG. 4D, an active element is added with the same concentration as the center region 55 and the outer peripheral region 57 of the core 51 in the first embodiment. However, in the core 51a of the amplification optical fiber of the present embodiment, the active element is not added in the intermediate region 56a, which is different from the core 51 of amplification optical fiber 50 of the first embodiment. The addition of the active element in the core 51a is set so as to satisfy the relation of Formulae (1) and (2), which is similar to the first embodiment.

In the amplification optical fiber of the present embodiment, the active element is not added in the intermediate region 56a of the core 51a so that in the intermediate region 56a including a part of the region C and the region E where the intensity of the LP01 mode is stronger than the intensities of the LP02 mode and the LP03 mode, the LP01 mode is not amplified. Similarly to the first embodiment, in the center region 55a and the outer peripheral region 57a including the region A and the region G where the intensities of the LP02 mode and the LP03 mode are stronger than the intensity of the LP01 mode and the region B and a part of the region F where the intensity of the LP02 mode is stronger than that of the LP01 mode, the light is amplified. As described above, in the core 51a, the active element is added so as to satisfy the above Formulae (1) and (2) so that the LP02 mode and the LP03 mode are amplified at a higher amplification factor than that of the LP01 mode in the entire core 51a.

According to the amplification optical fiber of the present embodiment, the active element is not added in the intermediate region 56a including the part of the region C and the region E where the intensity of the LP01 mode is strong, so that the LP01 mode is not amplified in this region. Accordingly, in the entire core 51a, the LP02 mode and the LP03 mode may be amplified at a higher amplification factor than that of the LP01 mode. Therefore, the non-linear optical effect is suppressed. so that even when the high power light is emitted, desired power light may be emitted.

(Third Embodiment)

Next, a third embodiment of the present invention will be described in detail with reference to FIGS. 5A to 5D. Same or similar components as the first embodiment are denoted by the same reference numerals and a repeated description will not be provided if not specifically described. FIGS. 5A to 5D are diagrams illustrating a state of a core of an amplification optical fiber according to the third embodiment of the present invention and corresponds to FIGS. 3A to 3D of the first embodiment.

Figure 5A:
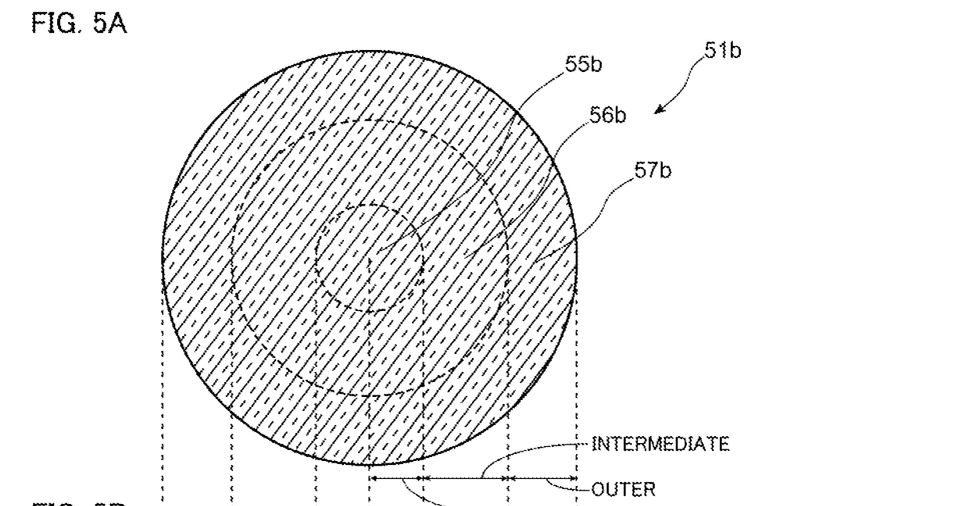
FIGS. 5A to 5D are diagrams illustrating a state of a core of an amplification optical fiber according to a third embodiment of the present invention.
Figure 5B:
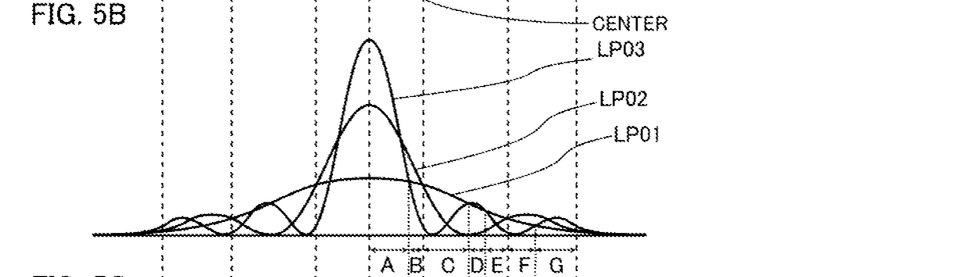
Figure 5C:
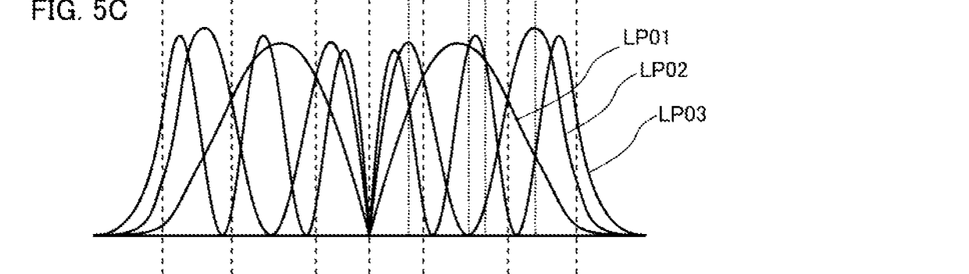
Figure 5D:
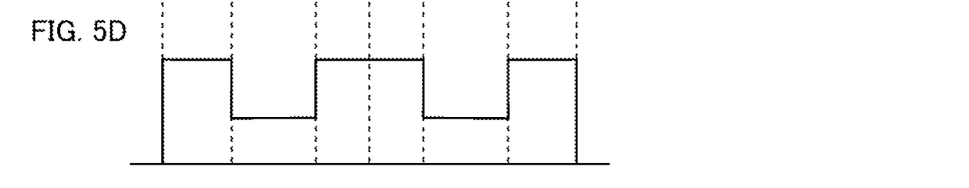

As illustrated in FIG. 5A, the amplification optical fiber in the embodiment uses a core 51b, instead of the core 51 of the amplification optical fiber 50 in the first embodiment. The core 51b is divided into a center region 55b, an intermediate region 56b, and an outer peripheral region 57b. However, in this case, a boundary between the center region 55b and the intermediate region 55b matches with a boundary between the region B and the region C and a boundary between the intermediate region 56b and the outer peripheral region 57b matches with a boundary between the region E and the region F, which is different from the core 51 of the first embodiment. Accordingly, the intermediate region 56b includes all of the region C and the region E where the intensity of the LP01 mode is stronger than the intensities of the LP02 mode and the LP03 mode.

In the core 51b of the amplification optical fiber of the present embodiment, a concentration of the active element Yb which is added in the center region 55b is equal to a concentration of the active element Yb which is added in the center region 55 of the core 51 of the first embodiment, a concentration of the active element Yb which is added in the intermediate region 56b is equal to a concentration of the active element Yb which is added in the intermediate region 56 of the core 51 of the first embodiment, and a concentration of the active element Yb which is added in the outer peripheral region 57b is equal to a concentration of the active element Yb which is added in the outer peripheral region 57 of the core 51 of the first embodiment.

Therefore, by adding the active element as described above, also in the present embodiment, the core 51b is set so as to satisfy the relation of Formulae (1) and (2).

In the amplification optical fiber of the present embodiment, the intermediate region 56b includes all of the region C and the region E where the intensity of the LP01 mode is stronger than the intensities of the LP02 mode and the LP03 mode. In the intermediate region 56b, the concentration of the active element is suppressed to be low so that the amplification of the LP01 mode is suppressed in the region C and the region E. Further, in the center region 55b and the outer peripheral region 57b, the intensity of at least one of the LP02 mode and the LP03 mode is stronger than the intensity of the LP01 mode, and in these regions, the active element Yb is added at a high concentration, which is similar to the first embodiment. Therefore, at least one of the LP02 mode and the LP03 mode is amplified at a high amplification factor. Specifically, in the region A included in the center region 55b and the region G included in the outer peripheral region, the intensities of both the LP02 mode and the LP03 mode are stronger than the intensity of the LP01 mode, so that both the LP02 mode and the LP03 mode are amplified at a higher amplification factor than that of the LP01 mode in the entire fiber.

According to the amplification optical fiber of the present embodiment, in all regions where the intensity of the LP01 mode is stronger than the intensities of the LP02 mode and the LP03 mode, the amplification of the light is suppressed so that the non-linear optical effect is suppressed. Therefore, even when the amplification factor of the light is higher than that of the first embodiment, in the entire amplification optical fiber 50, light having a desired power may be output.

(Fourth Embodiment)

Next, a fourth embodiment of the present invention will be described in detail with reference to FIGS. 6A to 6D. Same or similar components as the third embodiment are denoted by the same reference numerals and a repeated description will not be provided if not specifically described. FIGS. 6A to 6D are diagrams illustrating a state of a core of an amplification optical fiber according to the fourth embodiment of the present invention and corresponds to FIGS. 3A to 3D of the first embodiment.

Figure 6A:
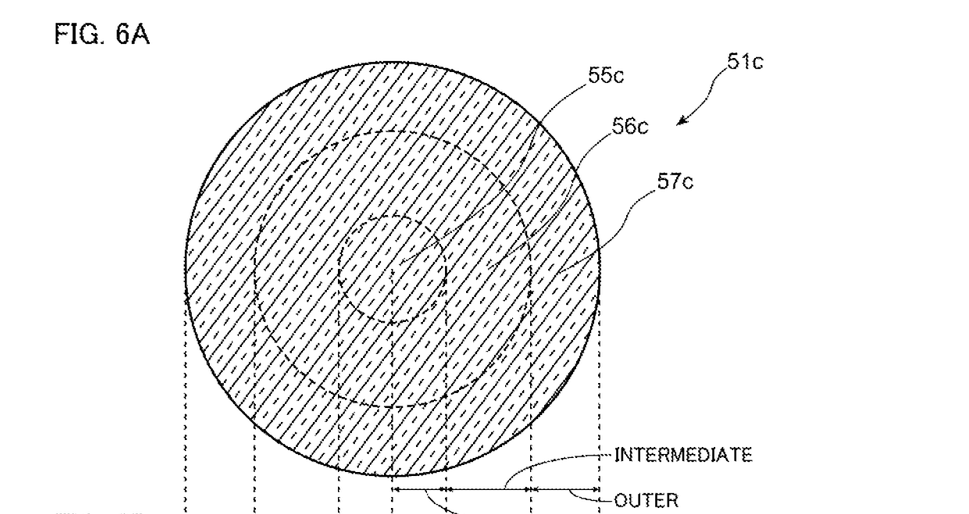
FIGS. 6A to 6D are diagrams illustrating a state of a core of an amplification optical fiber according to a fourth embodiment of the present invention.
Figure 6B:
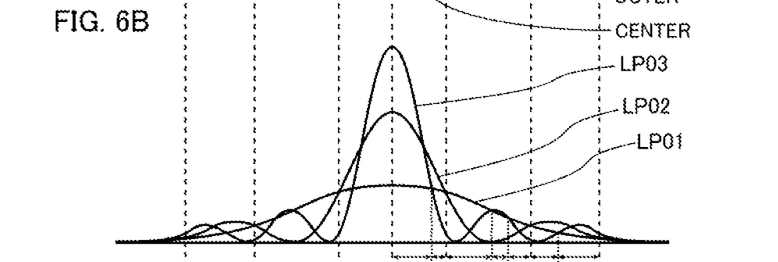
Figure 6C:
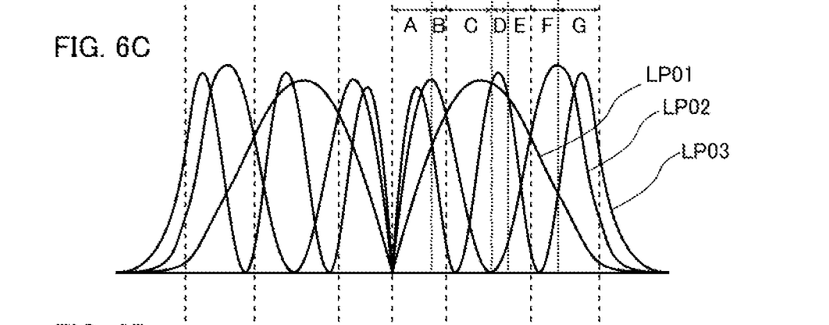
Figure 6D:
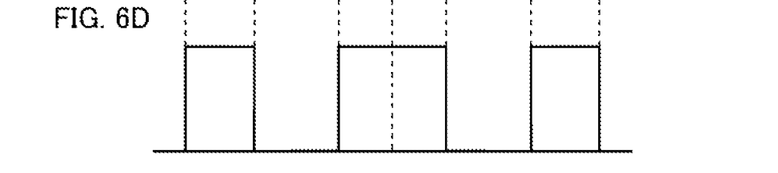

As illustrated in FIG. 5A, the amplification optical fiber in the embodiment uses a core 51c, instead of the core 51b of the amplification optical fiber in the third embodiment. Similarly to the core 51b of the third embodiment which is divided into the center region 55b, the intermediate region 56b, and the outer peripheral region 57b, the core 51c is divided into a center region 55c, an intermediate region 56c, and an outer peripheral region 57c. As illustrated in FIG. 6D, the active element is added in the center region 55c and the outer peripheral region 57c with the concentration which is the same as the concentration of the center region 55b and the outer peripheral region 57b of the core 51b of the third embodiment. However, in the core 51c of the amplification optical fiber of the present embodiment, the active element is not added in the intermediate region 56c, which is different from the core 51b of the third embodiment. Accordingly, when the LP01 mode, the LP02 mode and the LP03 mode are standardized by the power, in the region C and the region E where the intensity of the LP01 mode is stronger than the intensities of the LP02 mode and the LP03 mode, the active element Yb is not added.

By adding the active element with such a concentration distribution, also in the present embodiment, the core 51c is set so as to satisfy the relation of Formulae (1) and (2).

In the amplification optical fiber of the present embodiment, the active element is not added in the intermediate region 56c including the region C and the region E where the intensity of the LP01 mode is stronger than the intensities of the LP02 mode and the LP03 mode. Therefore, the light is not amplified in the region C and the region E where the intensity of the LP01 mode is strong. As a result, the amplification of the LP01 mode is suppressed in the entire fiber. Similarly to the third embodiment, in the center region 55c and the outer peripheral region 57c where the intensity of the at least one of the LP02 mode and the LP03 mode is stronger than the intensity of the LP01 mode, the light is amplified at the high amplification factor so that the LP02 mode and the LP03 mode are amplified at the high amplification factor in the entire amplification optical fiber.

According to the amplification optical fiber of the present embodiment, in the intermediate region 56c, the light is not amplified. Therefore, in the entire fiber, the amplification of the LP01 mode may be further suppressed and higher power light may be emitted.

(Fifth Embodiment)

Next, a fifth embodiment of the present invention will be described in detail with reference to FIGS. 7A to 7D. Same or similar components as the first embodiment are denoted by the same reference numerals and a repeated description will not be provided if not specifically described. FIGS. 7A to 7D are diagrams illustrating a state of a core of an amplification optical fiber according to the fifth embodiment of the present invention and corresponds to FIGS. 3A to 3D of the first embodiment.

Figure 7A:
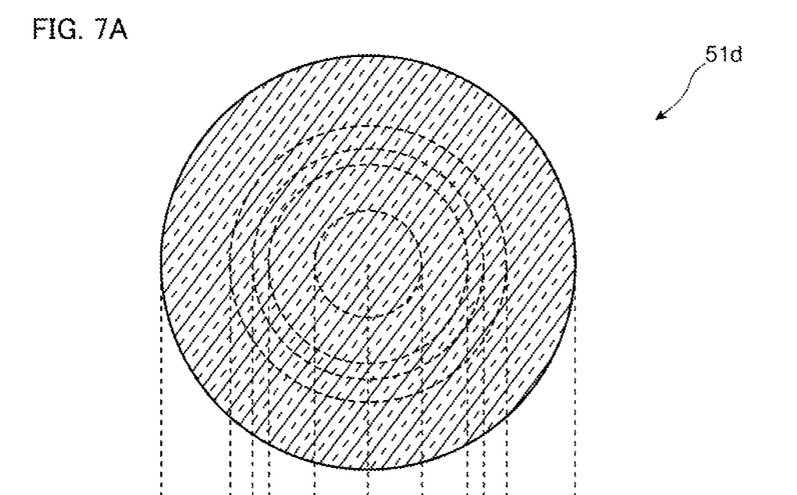
FIGS. 7A to 7D are diagrams illustrating a state of a core of an amplification optical fiber according to a fifth embodiment of the present invention.
Figure 7B:
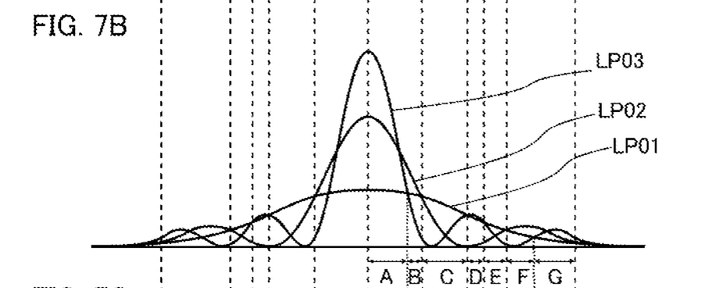
Figure 7C:
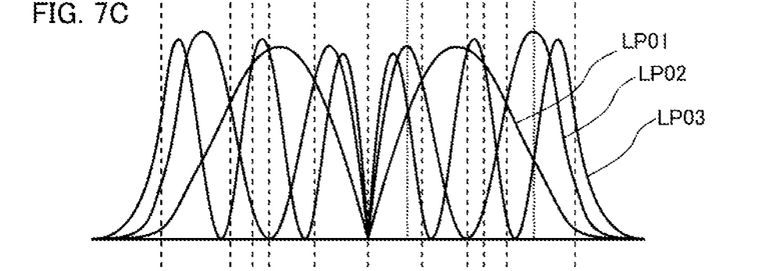
Figure 7D:
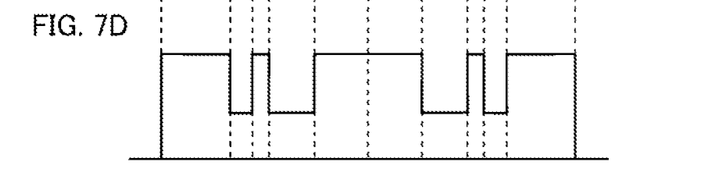

As illustrated in FIG. 7A, the amplification optical fiber in the embodiment uses a core 51d, instead of the core 51 of the amplification optical fiber 50 in the first embodiment. As illustrated in FIG. 7D, an active element Yb is added with a high concentration in a region A, a region B, the region D, a region F, and a region G of the core Bid and the active element Yb is added with a concentration, which is lower than that of the region A or the like, in a region C and a region E of the core 51d. That is, in the core 51 of the amplification optical fiber of the present embodiment, when the LP01 mode, the LP02 mode, and the LP03 mode are standardized by a power, in all regions (the region A, the region B, the region D, the region F, and the region G) where the intensity of at least one of the LP02 mode and the LP03 mode is stronger than the intensity of the LP01 mode, the active element is added with a higher concentration than that of all regions (the region C and the region E) where the intensity of the LP01 mode is stronger than the intensities of the LP02 mode and the LP03 mode.

Also in the present embodiment, the above Formulae (1) and (2) are satisfied.

In such an amplification optical fiber, in the region where the intensity of at least one of the LP02 mode and the LP03 mode is stronger than the intensity of the LP01 mode, the light is amplified at a high amplification factor and in the region where the intensity of the LP01 mode is stronger than the intensities of the LP02 mode and the LP03 mode, the light is amplified at a lower amplification factor. Accordingly, according to the amplification optical fiber of the present embodiment, the LP02 mode and the LP03 mode may be amplified while suppressing the amplification of the LP01 mode, so that the light may be amplified at the higher amplification factor.

In the core 51 of the amplification optical fiber of the present embodiment, when the LP01 mode, the LP02 mode, and the LP03 mode are standardized by a power, in the region where the intensity of the LP01 mode is stronger than the intensities of the LP02 mode and the LP03 mode, the active element may not be added. In other words, in the region C and the region E, the active, element may not be added. With the above configuration, in the region where the intensity of the LP01 mode is stronger than the intensities of the LP02 mode and the LP03 mode, the amplification of the LP01 mode is further suppressed without amplifying the light. Accordingly, it is possible to further suppress the non-linear optical effect from occurring.

(Sixth Embodiment)

Figure 8:
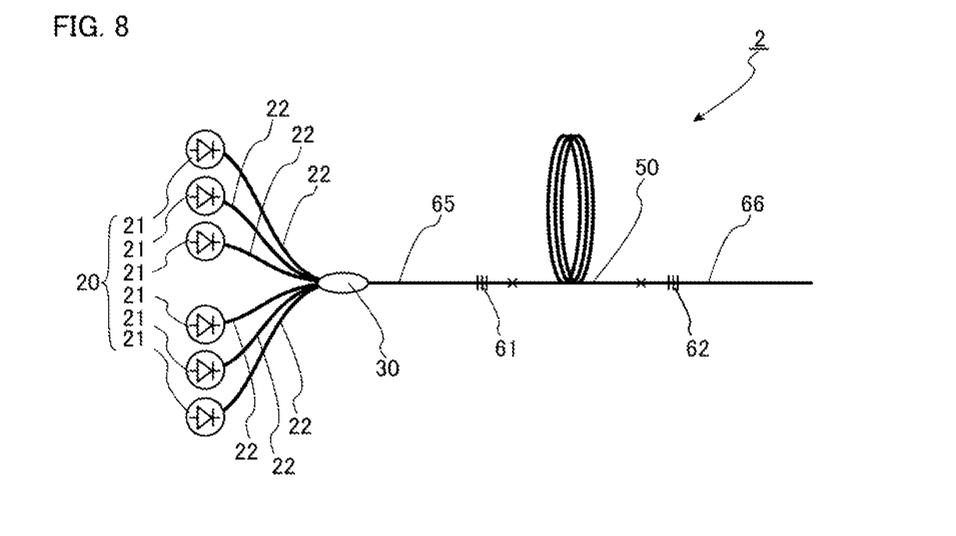
FIG. 8 is a diagram illustrating a resonator according to a sixth embodiment of the present invention.

Next, a sixth embodiment of the present invention will be described in detail with reference to FIG. 8. Same or similar components as the first embodiment are denoted by the same reference numerals and a repeated description will not be provided if not specifically described. FIG. 8 is a diagram illustrating a resonator according to the sixth embodiment of the present invention.

As illustrated in FIG. 8, a resonator 7 of the sixth embodiment includes a pumping light source 20, an amplification optical fiber 50, an optical combiner 30, a double clad fiber 65 which is provided between the amplification optical fiber 50 and the optical combiner 30, a first FBG 61 which is provided in the double clad fiber 65, a multi-mode fiber 66 which is provided at a side of the amplification optical fiber 50 which opposes to the double clad fiber 65, and a second FBG 62 which is provided in the multi-mode fiber 56 as main components.

The double clad fiber 65 has the same structure of a cross-section which is perpendicular to the length direction as in the amplification optical fiber and includes a core, clad which covers the core, and an outer clad which covers the clad. Even though outer diameters and refractive indexes of the core, the clad, and the outer clad of the double clad fiber 65 are substantially same as those of the core, the clad, and the outer clad of the amplification optical fiber 50, the active element is not added in the core of the double clad fiber 65. Similarly to the first embodiment in which the amplification optical fiber 50 is connected to the optical combiner 30, an end of the double clad fiber 65 is connected to the optical combiner 30 and thus the core of the multi-mode fiber 22 and the clad of the double clad fiber 65 are optically connected. Further, the other end of the double clad fiber 65 is connected to the amplification optical fiber 50, the core of the double clad fiber 65 is connected to the core 51 of the amplification optical fiber 50, and the clad of the double clad fiber 65 is connected to the clad 52 of the amplification optical fiber 50.

Further, the first FBG 61 is provided in the core of the double clad fiber 65. Thus, the first FBG 61 is provided at one side of the amplification optical fiber 50. In the first FBG 61, a portion where the refractive index becomes high at a predetermined period along a length direction of the double clad fiber 65 is repeated and the period is adjusted so that at least a part of the wavelength of the light which is emitted by the active element of the amplification optical fiber 50 which is in a pumping status is reflected. In the first FBG 51, when the active element is Yb as described above, for example, the reflectance is 100% at a wavelength of 1070 nm.

Further, in the multi-mode fiber 66 which is provided at a side of the amplification optical fiber 50 which opposes to the double clad fiber 65, similarly to the amplification optical fiber 50, a diameter of the core or refractive indexes of the core and the clad are set so as to propagate the LP01 mode, the LP02 mode, and the LP03 mode. Therefore, an end of the multi-mode fiber 66 is connected to the amplification optical fiber 50 and the other end becomes a free end to which nothing is connected and the core 51 of the amplification optical fiber 50 is connected to the core of the multi-mode fiber 66.

Further, the second FBG 62 is provided in the core of the multi-mode fiber 65. Thus, the second FBG 62 is provided at the other side of the amplification optical fiber 50. In the second FBG 62, a portion where the refractive index becomes high at a predetermined period along a length direction of the multi-mode fiber 66 is repeated and light having the same wavelength as the light which is reflected by the first FBG 61 is reflected at a lower reflectance than that of the first FBG 61. For example, the second FBG 62 is configured to reflect the light having the same reflectance as the light which is reflected by the first FBG 61 at a reflectance of 50%.

In such a resonator 2, when pumping light is emitted from a laser diode 21 of the pumping light source 20, the pumping light enters the clad of the double clad fiber 65 in the optical combiner 30 to enter the clad of the amplification optical fiber 50 from the clad of the double clad fiber 65. Therefore, similarly to the first embodiment, the active element which is added in the core 51 of the amplification optical fiber 50 becomes in a pumping status. The active element which is in the pumping status emits natural emission light having a specific wavelength. The natural emission light in this case, has a constant band at a center wavelength of 1070 nm. The natural emission light is propagated in the core 51 of the amplification optical fiber 50 and reflected by the first FRG 61 which is provided in the core of the double clad fiber 65, and the reflected light is reflected by the second FBG 62 to generate light resonance. Therefore, the light is amplified when the light is propagated in the core 51 of the amplification optical fiber 50 and a part of light transmits the second FBG and is emitted from the multi-mode fiber 66.

Also in the present embodiment, when the light propagates in the core 51 of the amplification optical fiber 50, the LP02 mode and the LP03 mode are amplified to be stronger than the LP01 mode light so that the non-linear optical effect may be suppressed. Even when the high power light is emitted, it is possible to emit the light having a desired power.

In the present embodiment, as the amplification optical fiber, an example in which an amplification optical fiber 50 of the first embodiment is used has been described, but the amplification optical fiber 50 which has been described in the second to fifth embodiments may be used.

The present invention has been described above with the first to sixth embodiments as examples, but the invention is not limited thereto.

Figure 9:
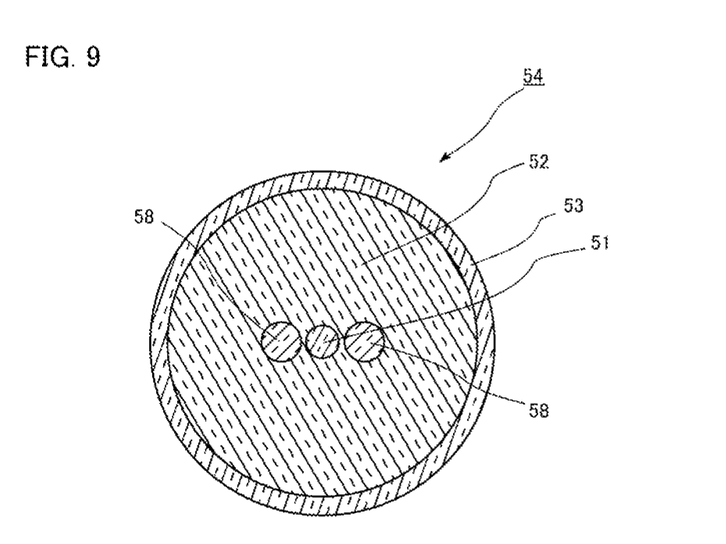
FIG. 9 is a diagram illustrating a modification of the amplification optical fiber according to the first embodiment.

For example, the amplification optical fiber 50 of the above-described embodiment has a structure in which only core 51 (51a, 51b, 51c, and 51d) is disposed in the clad 52, but the invention is not limited thereto. For example, a pair of stress applying units may be provided in the clad 52 of the amplification optical fiber 50 of the first embodiment. FIG. 9 is a diagram illustrating a modification of the amplification optical fiber 50 of the first embodiment. Same or similar components as the first embodiment are denoted by the same reference numerals and a repeated description will not be provided if not specifically described.

Referring to FIG. 9, the amplification optical fiber 54 is provided with pair of stress applying units go with the core 51 pinched therebetween in the clad 52, which is different from the amplification optical fiber 50 of the first embodiment. In other words, the amplification optical fiber 54 of the modification becomes polarization maintaining fiber (PANDA fiber). For example, when the diameter of the core 51 is 30 μm and the relative refractive index difference between the core 51 and the clad 52 is 0.32% as described above, each of the stress applying units 58 has a diameter of 35 μm and the relative refractive index difference between the core 51 and the clad 52 is −1% so that the stress applying unit is provided at an interval of 5 μm from the outer peripheral surface of the core 51. An example of a material which configures the stress applying unit 55 includes quartz to which boron (B) is added as a dopant. By providing the stress applying unit 58 as described above, single polarized light may be propagated. Such an amplification optical fiber 54 sets a polarization extinction ratio of light which enters the core 51 and light which is emitted from the core 51 to approximately 20 dB.

By emitting single polarized light, as compared with a case in which light which is not a single polarized wave is emitted, a wavelength of the emitted single polarized light efficiently converted to the light to be emitted. For example, in the optical fiber amplifier 1 in FIG. 1, the amplification optical fiber 54 is used instead of the amplification optical fiber 50 to connect a wavelength converter such as a wavelength converting fiber to an output terminal of the amplification optical fiber 54 to efficiently obtain wavelength converted light. For example, near-infrared seed light is emitted from the seed light source 10 so that visible light or ultraviolet light may be obtained. Further, also in the resonator illustrated in FIG. 8, the amplification optical fiber 54 is used instead of the amplification optical fiber 50 to connect the wavelength converter to an output terminal of the resonator so that light which is efficiently wavelength-converted from the light emitted from the amplification optical fiber 54 may be obtained. Accordingly, light which is in a band different from a reflection band of the first FBG 1 or the second FBG 62 may be obtained.

Such a stress applying unit may be provided in the clad similarly to the modification of the first embodiment also in the amplification optical fiber having the core according to the second to fifth embodiments.

Further, in the respective embodiments described above, the distribution of the addition concentration of the active element in the core satisfies the relation of Formulae (1) and (2). However, if the addition concentration satisfies any one of Formulae (1) and (2), any of the LP02 mode and the LP03 mode may be amplified at a higher amplification factor than that of the LP01 mode. Therefore, as compared with the related art, any of the LP02 mode and the LP03 mode may be amplified at a higher amplification factor than that of the LP01 mode, so that even when the high power light is emitted, it is possible to emit the light having a desired power as compared with the amplification optical fiber of the related art.

Further, in the first embodiment and the second embodiment, the active element may be added at a higher concentration in the region D than that of any other intermediate regions. For example, the active element may be added in the region D so as to have the same concentration as that in the center region and the outer peripheral region. By doing this, in the core, when the LP01 mode, the LP02 mode, and the LP03 mode are standardized by a power, in all regions (the region A, the region B, the region D, a part of the region F, and the region G) where the intensity of at least one of the LP01 mode and the LP03 mode is stronger than the intensity of the LP01 mode, the active element is added with a higher concentration than that of at least a part of regions (a part of the region C and the region E) where the intensity of the LP01 mode is stronger than the intensities of the LP02 mode and the LP03 mode so that both Formulae (1) and (2) are satisfied. With this configuration, the LP03 mode may be amplified at a higher amplification factor than those in the first embodiment and the second embodiment.

Further, in the amplification optical fiber 50 according to the above-described embodiments, in the center region, the intermediate region, and the outer peripheral region, the addition concentration of the active element Yb is set in two steps. However, if at least one of the relation of Formulae (1) and (2) is satisfied, the addition concentration may have distribution which is changed in three steps or more or distribution which is continuously changed without being limited to the two steps.

Further, in the first to fourth embodiments, as long as at least one of Formulae (1) and (2) is satisfied, the active element may not be added in the outer peripheral region. Alternatively, as long as at least one of Formulae (1) and (2) is satisfied, the active element may not be added in the center region. Also in such a configuration, at least one of the LP02 mode and the LP03 mode among entering light may be amplified at a higher amplification factor than that of the LP01 mode.

Further, in the first to fourth embodiments, as long as at least one of Formulae (1) and (2) is satisfied, the active elements which are added in the center region 55b and the outer peripheral region 57b may have different concentrations.

Further, in the first to sixth embodiments, even though the amplification optical fiber is configured so as not to propagate LP03 mode or higher order mode light among light which enters the core, but may be configured so as to propagate LP03 mode or higher order mode light.

Further, in the first to fifth embodiments, a front pumping configuration in Which the pumping light enters from an end surface of the amplification optical fiber which opposes to an output terminal side has been described as an example. However, a rear pumping configuration in which an optical combiner for the pumping light is provided at the output terminal side of the amplification optical fiber and the pumping light enters from an end surface of the output terminal side of the amplification optical fiber may be used.

Further, as an optical fiber which is connected to the seed light source 10, the multi-mode fiber may be used to allow the multi-mode light to enter the amplification optical fiber. In this case, the multi-mode fiber is used for a seed light propagating fiber of the optical combiner to weld and connect the multi-mode fiber and the seed light propagating fiber so as to approximately match a central axis of the multi-mode fiber which is connected to the seed light source with a central axis of the seed light propagating fiber of the optical combiner. By doing this, the multi-mode fiber propagates axial symmetrical mode and the seed light which enters the amplification optical fiber becomes light formed of axial symmetrical mode. By doing this, the seed light which enters the amplification optical fiber becomes only axial symmetrical higher order mode rather than the LP01 mode. Therefore, as compared with a case in which asymmetrical higher order mode is included in the seed light which enters the amplification optical fiber, beam quality light which is easily concentrated may be emitted. As an example of such a multi-mode fiber, there is a multi-mode fiber which propagates the LP01 mode, the LP02 mode and the LP03 mode but does not propagate LP04 mode or higher order mode. As such a multi-mode fiber, when the light which propagates in the core is 1070 µm, a diameter of the core may be 30 µm and the relative refractive index difference between the core and the clad may be 0.32%.

Further, the optical fiber amplifier 1 or the resonator 2 which are described in the above embodiment may be used as a fiber laser device as it is.

INDUSTRIAL APPLICABILITY

As described above, according to the present invention, an amplification optical fiber which may emit light having a desired power and an optical fiber amplifier and a resonator using the same are provided and the invention may be applied in a processing field or a medical field which uses a laser beam.

DESCRIPTION OF REFERENCE NUMERALS

1 . . . optical fiber amplifier
2 . . . resonator
10 . . . seed light source
15 . . . single mode fiber
20 . . . pumping light source
21 . . . laser diode
22 . . . multi-mode fiber
30 . . . optical combiner
50, 54 . . . amplification optical fiber
51, 51a, 51b, 51c, 51d . . . core
52 . . . clad
53 . . . outer clad
55, 55a, 55b, 55c . . . center region
55, 55a, 56b, 56c . . . intermediate region
57, 57a, 57b, 57c . . . outer peripheral region
58 . . . stress applying unit
61 . . . first FBG
62 . . . second FBG

The invention claimed is:

1. An amplification optical fiber, comprising:
a core and a clad which covers the core,
wherein the core propagates light having a predetermined wavelength in at least an LP01 mode, an LP02 mode, and an LP03 mode,
in the core, when the LP01 mode, the LP02 mode, and the LP03 mode are standardized by a power, in at least a part of a region where an intensity of at least one of the LP02 mode and the LP03 mode is stronger than an intensity of the LP01 mode, an active element which stimulates and emits the light having the predetermined wavelength is added with a higher concentration than that in at least a part of a region where the intensity of the LP01 mode is stronger than the intensities of the LP02 mode and the LP03 mode, and at least one of the following Formulae (1) and (2) is satisfied $$\int_0^b n(r) \times \{I_{02}(r) - I_{01}(r)\} r dr > O \quad (1)$$

$$\int_0^b n(r) \times \{I_{03}(r) - I_{01}(r)\} r dr > O \quad (2)$$

(In this case, r is a distance from the center in the radial direction of the core, $I_{01}(r)$ is an intensity of the LP01 mode in the distance r from the center in the radial direction of the core, $I_{02}(r)$ is an intensity of the LP02 mode in the distance r from the center in the radial direction of the core, and $I_{03}(r)$ is an intensity of the LP03 mode in the distance r from the center in the radial direction of the core, n(r) is a concentration of an added active element in the distance r from the center in the radial direction of the core, and b is a radius of the core.)

2. The amplification optical fiber according to claim 1, wherein, in the core, when the LP01 mode, the LP02 mode, and the LP03 mode are standardized by a power, in at least a part of a region where the intensity of the LP02 mode is stronger than the intensity of the LPO1 mode and at least a part of a region where the intensity of the LP03 mode is stronger than the intensity of the LPO1 mode, the active element is added with a higher concentration than that in at least a part of a region where the intensity of the LPO1 mode is stronger than the intensities of the LP02 mode and the LP03 mode, and both Formulae (1) and (2) are satisfied.

3. The amplification optical fiber according to claim 2, wherein, in the core, when the LP01 mode, the LP02 mode, and the LP03 mode are standardized by a power, in at least a part of a region where both the intensity of the LP02 mode and the intensity of the LP03 mode are stronger than the intensity of the LP01 mode, the active element is added with a higher concentration than that in at least a part of a region where the intensity of the LP01 mode is stronger than the intensities of the LP02 mode and the LP03 mode.

4. The amplification optical fiber according to claim 3, wherein, in the core, when the LP01 mode, the LP02 mode, and the LP03 mode are standardized by a power, in an entire region where both the intensity of the LP02 mode and the intensity of the LP03 mode are stronger than the intensity of the LP01 mode, the active element is added with a higher concentration than that in at least a part of a region where the intensity of the LP01 mode is stronger than the intensities of the LP02 mode and the LP03 mode.

5. The amplification optical fiber according to claim 1, wherein, in the core, when the LP01 mode, the LP02 mode, and the LP03 mode are standardized by a power, in the entire region where the intensity of at least one of the LP02 mode and the LP03 mode is stronger than the intensity of the LP01 mode, the active element is added with a higher concentration than that in at least a part of a region where the intensity of the LP01 mode is stronger than the intensities of the LP02 mode and the LP03 mode, and
both Formulae (1) and (2) are satisfied.

6. The amplification optical fiber according to claim 1, wherein no active element is added in at least a part of a region where the intensity of the LP01 mode is stronger than the intensities of the LP02 mode and the LP03 mode.

7. The amplification optical fiber according to claim 1, wherein, in the core, when the LP01 mode, the LP02 mode, and the LP03 mode are standardized by a power, in at least a part of a region where the intensity of at least one of the LP02 mode and the LP03 mode is stronger than the intensity of the LP01 mode, the active element which stimulates and emits the light having the predetermined wavelength is added with a higher concentration than that in the entire region where the intensity of the LP01 mode is stronger than the intensities of the LP02 mode and the LP03 mode.

8. The amplification optical fiber according to claim 7, wherein, in the core, when the LP01 mode, the LP02 mode, and the LP03 mode are standardized by a power, in at least a part of a region where the intensity of the LP02 mode is stronger than the intensity of the LP01 mode and at least a part of a region where the intensity of the LP03 mode is stronger than the intensity of the LP01 mode, the active element is added with a higher concentration than that in the entire region where the intensity of the LP01 mode is stronger than the intensities of the LP02 mode and the LP03 mode, and both Formulae (1) and (2) are satisfied.

9. The amplification optical fiber according to claim 8, wherein, in the core, when the LP01 mode, the LP02 mode, and the LP03 mode are standardized by a power, in at least a part of a region where both the intensity of the LP02 mode and the intensity of the LP03 mode are stronger than the intensity of the LP01 mode, the active element is added with a higher concentration than that in the entire region where the intensity of the LP01 mode is stronger than the intensities of the LP02 mode and the LP03 mode.

10. The amplification optical fiber according to claim 9, wherein, in the core, when the LP01 mode, the LP02 mode, and the LP03 mode are standardized by a power, in the entire region where both the intensity of the LP02 mode and the intensity of the LP03 mode are stronger than the intensity of the LP01 mode, the active element is added with a higher concentration than that in the entire region where the intensity of the LP01 mode is stronger than the intensities of the LP02 mode and the LP03 mode.

11. The amplification optical fiber according to claim 7, wherein, in the core, when the LP01 mode, the LP02 mode, and the LP03 mode are standardized by a power, in the entire region where the intensity of at least one of the LP02 mode and the LP03 mode is stronger than the intensity of the LP01 mode, the active element is added with a higher concentration than that in the entire region where the intensity of the LP01 mode is stronger than the intensities of the LP02 mode and the LP03 mode, and
both Formulae (1) and (2) are satisfied.

12. The amplification optical fiber according to claim 7, wherein no active element is added in a region where the intensity of the LP01 mode is stronger than the intensities of the LP02 mode and the LP03 mode.

13. The amplification optical fiber according to claim 1, wherein a pair of stress applying units which pinches the core is provided in the clad.

14. An optical fiber amplifier, comprising:
the amplification optical fiber according to claim 1;
a seed light source which allows seed light including an LP02 mode and an LP03 mode to enter the amplification optical fiber; and
a pumping light source which emits pumping light which pumps the active element of the amplification optical fiber.

15. The optical fiber amplifier according to claim 14, wherein the seed light which enters the amplification optical fiber pumps only axial symmetrical mode of the amplification optical fiber.

16. A resonator, comprising:
the amplification optical fiber according to claim 1;
a pumping light source which emits pumping light which pumps the active element of the amplification optical fiber;
a first FBG which is provided at one side of the amplification optical fiber to reflect at least part of light having a wavelength of light which is emitted by the active element which is pumped by the pumping light; and
a second FBG which is provided at the other side of the amplification optical fiber to reflect light having the same wavelength as the light reflected by the first FBG at a reflectance which is lower than that of the first FBG.

* * * * *